(12) United States Patent
Calisi et al.

(10) Patent No.: US 6,668,731 B2
(45) Date of Patent: Dec. 30, 2003

(54) CONVEYOR ROLLER WITH CHAIN ATTACHMENT LINK

(76) Inventors: John Calisi, 112 Adams Rd., Concord, MA (US) 01742; Domenic A. Previte, III, 48 Vose Hill Rd., Westford, MA (US) 01886

( * ) Notice: Subject to any disclaimer, the term of this patent is extended or adjusted under 35 U.S.C. 154(b) by 0 days.

(21) Appl. No.: 10/128,826

(22) Filed: Apr. 24, 2002

(65) Prior Publication Data

US 2003/0200892 A1 Oct. 30, 2003

(51) Int. Cl.[7] .............................................. B61B 10/00
(52) U.S. Cl. ................................................... 104/172.3
(58) Field of Search ........................... 104/172.3, 172.1, 104/172.5, 165; 198/717, 732; 403/378, 379

(56) References Cited

U.S. PATENT DOCUMENTS

| | | | | |
|---|---|---|---|---|
| 3,596,605 A | * | 8/1971 | Shelstad | 104/172.3 |
| RE30,026 E | | 6/1979 | Hanna et al. | |
| 4,194,449 A | | 3/1980 | Breau | |
| 4,374,496 A | | 2/1983 | Hanna | |
| 4,715,287 A | | 12/1987 | Wentworth et al. | |
| D293,953 S | * | 1/1988 | MacNeil | D34/35 |
| 4,836,357 A | * | 6/1989 | Focke | 198/779 |
| 4,873,929 A | * | 10/1989 | Witecki | 104/172.3 |
| 5,140,910 A | * | 8/1992 | Welter | 104/172.3 |
| 6,186,073 B1 | * | 2/2001 | Reitsch, Jr. | 104/172.1 |

FOREIGN PATENT DOCUMENTS

GB 2227218 A * 7/1990 ........... B65G/17/24

* cited by examiner

Primary Examiner—Frantz F. Jules
(74) Attorney, Agent, or Firm—Wolf, Greenfield & Sacks, P.C.

(57) ABSTRACT

A conveyor roller assembly typically for pushing a vehicle through a car wash having a chain drive and split track, includes a bar extending form its forward end beneath the track to its back end above it. The back end carries a pair of rollers that travel on the track and a second pair of rollers for pushing against the tire of the vehicle. The front end carries an axle rigidly attached to the bar and a pair links one on each side of the bar and each link rigidly carrying a sleeve having a very close tolerance with the axle and through which the axle extends. The links attach to the chain drive, and rollers are carried by the sleeves and engage the lower surface of the track. The link, sleeve and roller arrangement causes the conveyor roller assembly to maintain alignment with the track.

10 Claims, 2 Drawing Sheets

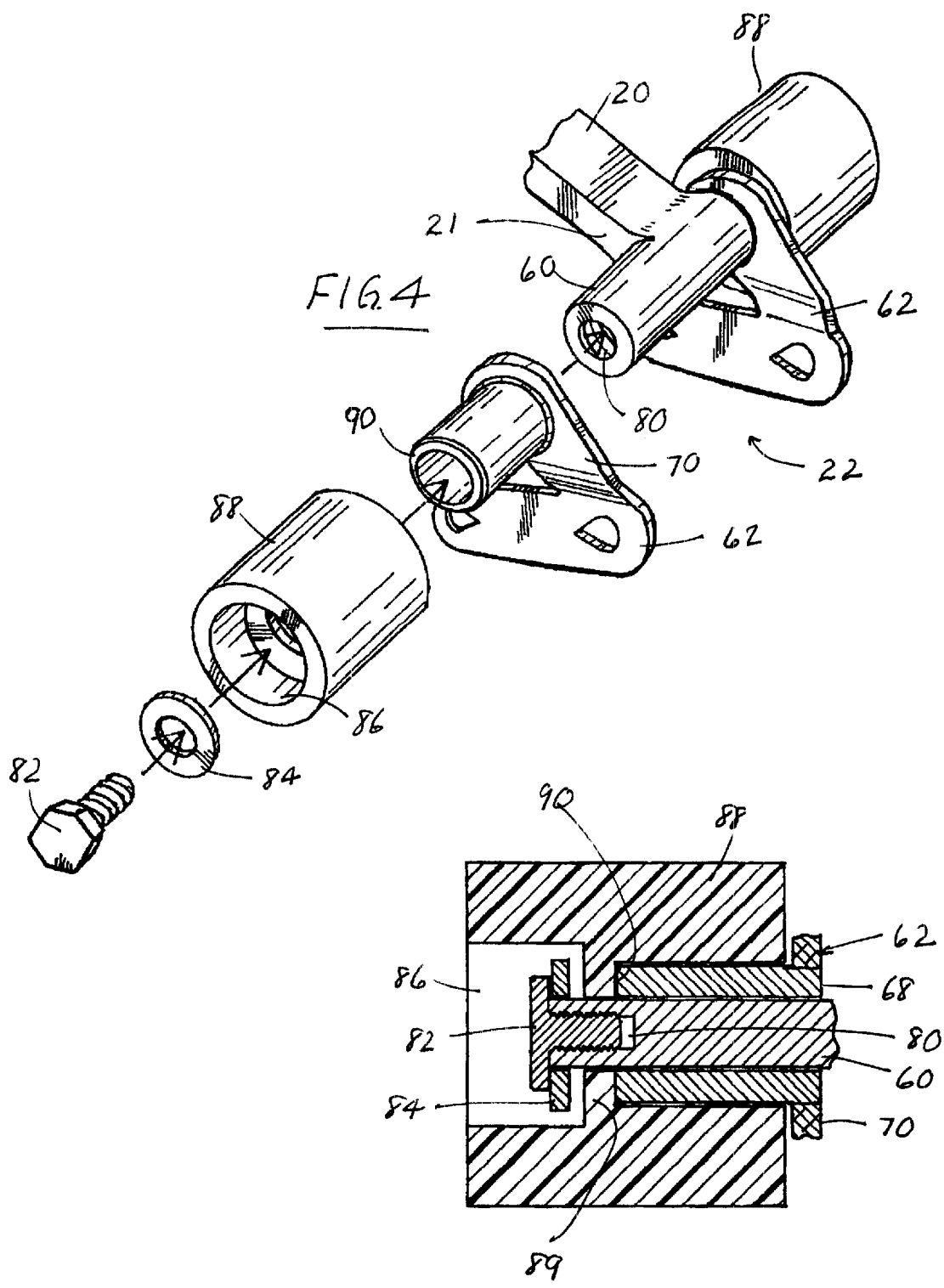

CONVEYOR ROLLER WITH CHAIN ATTACHMENT LINK

FIELD OF THE INVENTION

This invention relates to roller/pusher assemblies employed in conveyor systems and more particularly is directed to a conveyor roller assembly typically used in car washes for pushing a vehicle along the car wash track.

BACKGROUND OF THE INVENTION

Conveyor roller assemblies for pushing vehicles along the track of a car wash have been used for many years. However, difficulties have regularly been encountered because the conveyor roller assemblies frequently become misaligned with the track. Several different factors may be responsible for this action. Links are used to connect conveyor roller assemblies to the chain drive of the car wash, and the links are frequently connected by bolts to the assembly axle that carries the guide rollers that engage the tracks. The bolted connection between the axle and the links frequently become loose because of wear, and the axle therefore, may wobble with respect to the links allowing the assemblies to twist and deflect with respect to the centerline of the track. In other systems of the prior art, the links have holes through which the axles extend, and because the links are of limited thickness, they are not capable of maintaining a precise orientation of the axle axis with respect to the links. This condition becomes more acute as the holes in the links through which the axles extend become enlarged with wear. The resulting slack in the connection allows the guide rollers to deviate from a precise path on the track. Another difficulty encountered with conveyor rollers of the prior art is the need for removing the links from the chain drive in order to replace worn rollers.

SUMMARY OF THE INVENTION

In accordance with the present invention, the links that connect the chain drive to the shaft of the conveyor roller assembly carries a sleeve having a diameter that has a close tolerance with respect to the axle of the conveyor roller to which it is connected so that the link has no freedom to wobble with respect to the axle axis. In accordance with one aspect of the invention, two such links are provided, one on each side of a bar that not only carries the axle of the guide rollers, but also of the pusher rollers disposed above the track. The sleeves on the links extend away from the bar and serve as shafts for the guide rollers. The sleeves that carry the rollers prevent any cocking of the bar and rather cause the rollers to track straight, precisely parallel with the tracks of the car wash. The links may take any one of a number of different shapes necessary for their connection to the chain.

The ends of the axles have internally threaded holes, and the rollers have recessed ends that are substantially larger in diameter than the openings in the rollers which receives the sleeve. A bolt and washer are disposed in the recess of each with the bolt threaded into the threaded hole in the axle. A shoulder is provided in each of the rollers adjacent the outer end of each sleeve. This assembly retains the roller in place. The guide rollers are disposed one on each side of the track slot with the guide rollers bearing against the bottom surface of the track. The rollers at the rear end of the bar engage the vehicle wheel and push against it causing the upper surface of the track and the vehicle wheel to roll along the track.

BRIEF DESCRIPTION OF THE DRAWINGS

FIG. 3 is a cross-sectional view of a portion of the conveyor roller assembly taken along the section line 3—3 of FIG. 2; and FIG. 4 is an exploded view of one of the rollers and connecting link, in accordance with the present invention.

DETAILED DESCRIPTION

Figure 1:
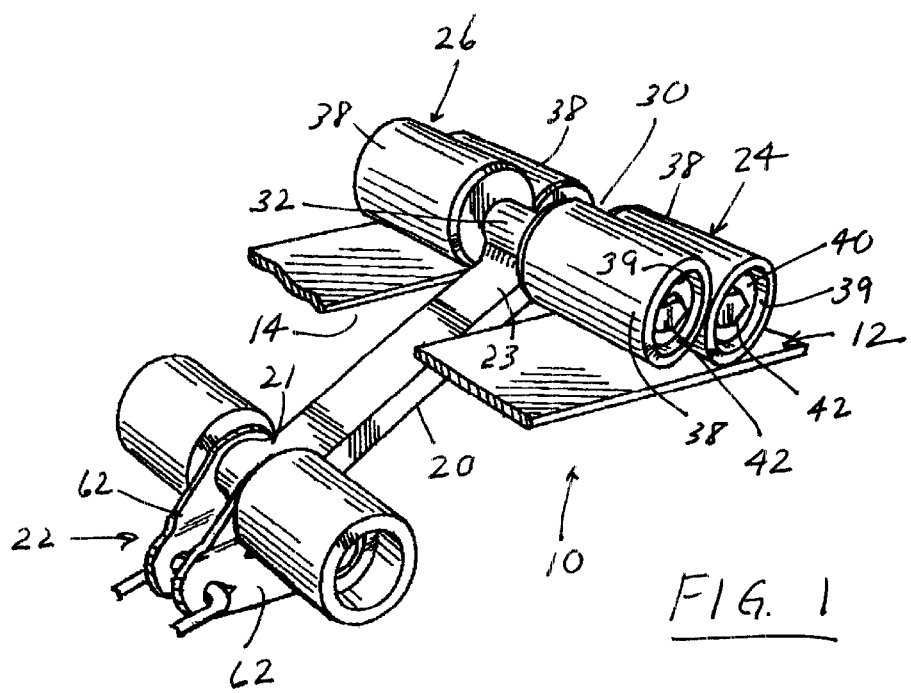
FIG. 1 is a perspective view of a conveyor roller assembly shown in the operative position on a slotted track and connected to an endless chain.
Figure 2:
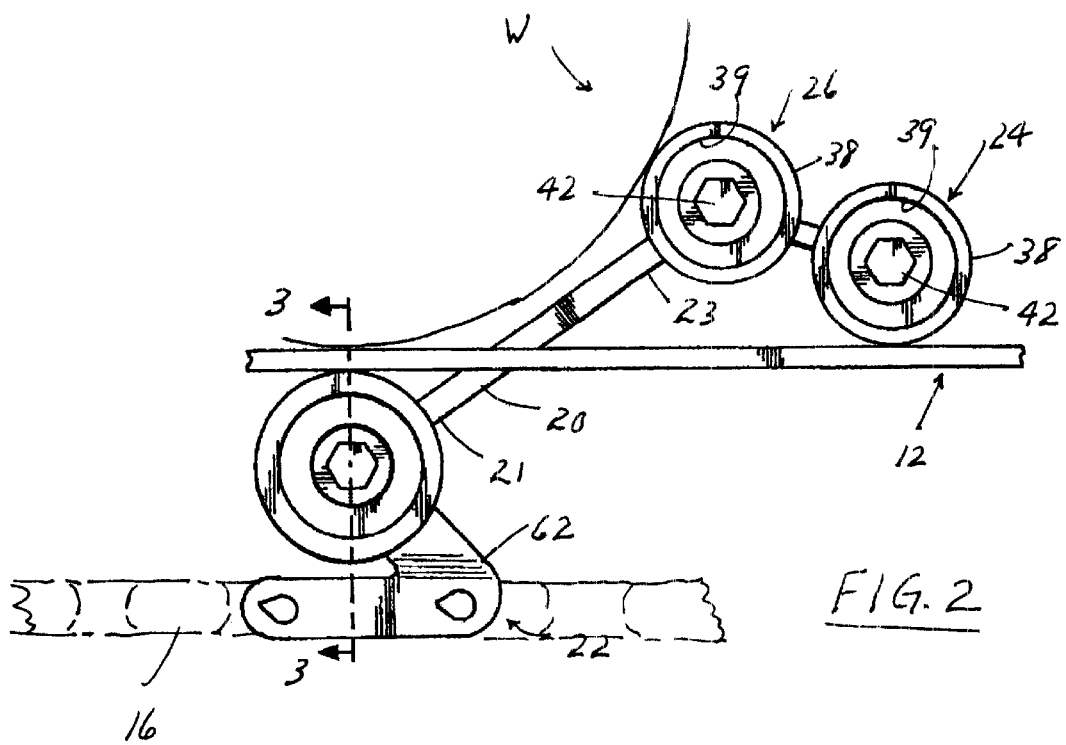
FIG. 2 is a side view of the conveyor roller assembly shown in FIG. 1.

In FIG. 1 a portion of an automobile car wash conveyor C is shown and in FIG. 2 a vehicle wheel W is suggested disposed on the track of the car wash. The automobile is being pushed along the track by the conveyor roller assembly 10. The conveyor shown includes a split track 12 on which one wheel of the vehicle rolls, and the conveyor roller assembly 10 is disposed in part above and in part below the track and extends through the slot 14 that splits the track. The conveyor chain 16 is disposed beneath the track and the conveyor roller assembly 10 is attached to it and is drawn along the track as is described in greater detail below.

The conveyor roller assembly 10 includes a bar 20 typically made of steel and carries a linkage 22 at its front end, which joins the conveyor roller assembly to the chain. The linkage is connected to the front end 21 of the bar 20, and the rear end 23 of the bar carries two pairs of rollers 24 and 26, the rollers 24 rolling along the upper surface 28 of the track as the roller assembly is drawn along the track by the chain 16. The pair of rollers 26 in the normal operating position of the roller assembly is disposed above the roller assembly 24 and spaced above the track surface. The two roller assemblies 24 and 26 do not engage one another, and the pair of rollers 26 are free to turn as the vehicle wheel which it engages rolls along the surface 28 of the track.

The pairs of rollers 24 and 26 in the embodiment shown are mounted on a pair of fixed axles 30 and 32 secured as by welding to the rear end 23 of the bar 20 perpendicular to the longitudinal center line of the bar and oriented horizontally when the bar is in an operative position. Each axle 30 and 32 at both ends has a threaded hole 36 coaxial with their respective axles. Each end of each axle carries a roller 38 having a large circular recess 39 at its outside end. The inner diameter of the rollers is closely matched to the outer diameter of its axle and the rollers are free to rotate on the axles without limited wobbling and maintain their coaxial relationship with the axles. The rollers are retained in place by washers 40 that bear against the ends of the axles and that are retained in turn on the axles by the bolts 42 screwed into the threaded holes 36 in the axle ends.

While a specific arrangement is illustrated and described for retaining the rear pairs of rollers on their respective axles, it should be appreciated that many different arrangements may be used. For example, the ends of the rollers need not be recessed to receive the washers 40 and bolts 42, but rather they may be located outwardly of the ends of the rollers in the manner typically shown in Witecki U.S. Pat. No. 4,873,929. It should also be appreciated that the bar 20 may have an upwardly or downwardly extending back end 23, or alternatively the bar may be flat throughout its length as shown in the Witecki '929 patent or the bar may have a curved configuration as shown in Wentworth, et al U.S. Pat. No. 4,715,287. Moreover, the axles 30 and 32 may be disposed on the same side or alternatively opposite sides of the bar 20, and the upper rollers engaging the automobile wheel may either be disposed forward or rearward of the other rear rollers riding on the track.

The linkage assembly 22 that joins the roller assembly 10 to the chain 16 is mounted on an axle 60 that is arranged parallel to the axles 30 and 32 and welded to the front end 21 of the bar 20. While the axle 60 preferably is welded in place, it may be secured to the bar by being bolted thereto or by any other manner. The axis of the axle 60 should remain precisely perpendicular to the longitudinal center line of the bar and that it be oriented horizontally when actively engaged in pulling the roller assemblies 24 and 26 that in turn push the rear wheel of the vehicle along the track. The linkage 22 in the embodiment shown includes a pair of links 62, each having a circular opening 64 and carrying a sleeve 66 that is welded within the opening 64 with the end 68 of the sleeve in the plane of the surface 70 of the link. The inner diameter of the sleeve 66 has a close tolerance with respect to the outer diameter of the axle 60 so that when the axle rotates as it is disposed in the sleeve, no wobbling motion occurs to displace the sleeve axis from its concentric position with respect to the axle axis. The link which is shown as being V-shaped in this embodiment has a pair of additional openings 74 and 76 to facilitate attachment of the link 62 to the chain 16.

While the link 62 in the illustrated embodiment is V-shaped, it is to be t, understood that the link may take many other shapes and forms. For example, while the two links in the embodiment shown are physically separate from one another, that is, they are not attached together except by means of their mountings on the axle 60, they may in fact be connected together by a bar, rod, sleeve etc. in addition to the relationship established by being mounted on a common axle. Any shape that will enable the linkage 22 to be attached both to the chain drive 16 of the car wash and to the axle 60 of the guide rollers that engage the bottom of the track should be acceptable.

In the embodiment shown, the axle 60 like the axles at the rear of the assembly, has threaded holes 80 concentric with the axle axis at each end, and the forward rollers are attached by bolts 82 and washers 84 that are contained in recesses 86 provided in the outside ends of the rear rollers 88. And just as the rollers at the rear of the assembly, the guide rollers 88 at the forward end 21 of the bar may be attached by other arrangements to the axles. The washers and bolts need not be recessed. It is however, important that the clearance between the rollers and the sleeves be limited so that the rollers do not wobble with respect to the sleeves. Assembled as described, there should be no wobbling of the rollers on the sleeves or the sleeves on the axle.

As shown in FIG. 3, an inwardly extending flange 89 is formed on the rollers 88 positioned to bear against the end 90 of the sleeve 66 to prevent the rollers from forcefully engaging the face of link 62 or the weld 92 joining the link to the sleeve. This same feature may be employed to position the rollers 38 in the roller assemblies 24 and 26.

Not only does the construction described avoid the cocking of the conveyor roller assembly with respect to the track, but it is evident from the foregoing description and drawings that all of the rollers may easily be replaced including the front guide rollers without disconnecting the links from the chain of the car wash. The links do not in any way impede access to the bolts that retain the rollers on the axles.

Having described this invention in detail, those skilled in the art will appreciate that numerous modifications may be made of this invention without departing from its spirit. Therefore, it is not intended that the breadth of the invention be limited to the specific embodiments illustrated and described. Rather, the breadth of the invention should be determined by the appended claims and their equivalents.

What is claimed is:

1. A conveyor roller assembly for pushing an object along a longitudinally slotted track comprising
    a bar having front and back ends and adapted to extend through the longitudinal slot in the track with its front end disposed beneath the track and its back end disposed above the track,
    a pair of roller sub-assemblies attached to the back end of the bar, one of said subassemblies positioned to ride upon and follow the upper surface of the track and the other subassembly positioned above the track to engage and push the object along the track,
    and a linkage assembly attached to the front end of the bar for connecting the roller subassemblies to a chain conveyor disposed beneath the track and for maintaining longitudinal alignment of the roller subassemblies on the track, said linkage assembly including
    an axle immovably secured to the front end of the bar and perpendicular to the longitudinal center line of the bar and extending transversely across and beyond the sides of the bar
    a pair of links each having holes for receiving the axle, one on each side of the bar,
    rigid sleeves connected to each of the links and axially aligned with the holes in the links, said sleeves having inner diameters with a close tolerance with respect to the diameter of the axle and disposed one on each side of the axle and extending away from the bar,
    rollers for tracking the bottom surface of the track and mounted one on each sleeve by means of an axial opening through each roller, said roller and openings and sleeves having a close tolerance fit with respect to one another,
    and means provided on the rollers for preventing the rollers from engaging the links.

2. A linkage mechanism for connecting a roller pusher assembly to a chair conveyor to cause the assembly to remain longitudinally aligned with a track and wherein the assembly has an axle at its front end transverse to the longitudinal centerline of the track comprising
    a pair of links each mounted on the axle, one on each side of the track,
    sleeves coaxially mounted on each link and disposed on each side of the assembly,
    rollers mounted coaxially on the sleeves in close tolerance therewith for riding along the track,
    and a shoulder provided on the roller for engaging the end of the sleeve for preventing the roller from moving axially on the axle.

3. A linkage mechanism as defined in claim 2 wherein fasteners are attached to the ends of the axle to retain the rollers on the sleeves.

4. A linkage mechanism as defined in claim 2 wherein the fastener includes bolts threaded into the ends of the axle.

5. A linkage mechanism as defined in claim 2 wherein ends of the rollers extend beyond the ends of the axle, and recesses are provided in those ends of the rollers and house the fasteners.

6. A linkage mechanism as defined in claim 5 wherein the fasteners comprise washers housed in the recesses and engage the shoulders in the rollers and are retained in place by bolts threaded into the ends of the axle.

7. A linkage mechanism comprising
    a link having means for connecting to a chain conveyor,
    an opening in the link for receiving an axle,
    a rigid sleeve attached to the link and concentric with the opening for surrounding the axle, the inner diameter of the sleeve having a close fit on the axle to maintain a constant coaxial relationship between the link and the member,
    a roller mounted over the sleeve and coaxial therewith,
    and means provided in the roller for preventing the roller from engaging the link.

8. A linkage mechanism as described in claim 7 wherein the means is a shoulder in the roller engaging the end of the sleeve away from the link.

9. A linkage mechanism as described in claim 7 wherein the end of the roller away from the link is recessed, and a fastener is disposed in the recess for retaining the roller on the sleeve.

10. A linkage mechanism as described in claim 9 wherein the fastener includes a bolt attached to the end of the shaft.

* * * * *